US008319472B2

(12) United States Patent
Gibbs et al.

(10) Patent No.: US 8,319,472 B2
(45) Date of Patent: Nov. 27, 2012

(54) METHOD AND SYSTEM FOR INTERNALLY JUMP-STARTING AN ENGINE

(75) Inventors: James C. Gibbs, Brighton, MI (US); Carlene M. Sienkiewicz, Brighton, MI (US); Daryl A. Wilson, Brighton, MI (US); Matthew J. Klemmer, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 618 days.

(21) Appl. No.: 12/355,886

(22) Filed: Jan. 19, 2009

(65) Prior Publication Data

US 2010/0181959 A1 Jul. 22, 2010

(51) Int. Cl.
*H02J 7/00* (2006.01)
(52) U.S. Cl. .................... 320/103; 320/104; 307/10.6
(58) Field of Classification Search .................. 320/103, 320/104; 701/22; 180/65.1; 307/10.6
See application file for complete search history.

(56) References Cited

U.S. PATENT DOCUMENTS

| | | | | |
|---|---|---|---|---|
| 5,677,614 A * | 10/1997 | Ohmori et al. | ................. | 320/103 |
| 5,977,744 A * | 11/1999 | Williams et al. | ............. | 320/104 |
| 6,057,666 A * | 5/2000 | Dougherty et al. | ........... | 320/104 |
| 6,522,960 B2 * | 2/2003 | Nada | ............................... | 701/22 |
| 7,128,037 B2 | 10/2006 | Tumback et al. | | |
| 7,267,090 B2 * | 9/2007 | Tamai et al. | ............... | 123/179.3 |
| 7,277,781 B2 * | 10/2007 | Cawthorne et al. | ............ | 701/22 |
| 7,336,002 B2 * | 2/2008 | Kato et al. | .................... | 307/10.6 |
| 7,602,140 B2 * | 10/2009 | Asaumi et al. | ................ | 320/104 |
| 2005/0247280 A1 * | 11/2005 | Asada et al. | ................ | 123/179.3 |
| 2006/0097577 A1 * | 5/2006 | Kato et al. | ................... | 307/10.1 |
| 2011/0175357 A1 * | 7/2011 | Navetta | ........................... | 290/47 |

* cited by examiner

*Primary Examiner* — Edward Tso
*Assistant Examiner* — Manuel Hernandez
(74) *Attorney, Agent, or Firm* — Ingrassia Fisher & Lorenz, P.C.

(57) ABSTRACT

Methods and apparatus are provided for performing a jump-start without the use of external equipment. The apparatus comprises a first battery electrically coupled to a starter motor for an engine, the first battery providing power to start the engine; a second battery; a power converter electrically coupled to the first battery and electrically coupled to the second battery; and a controller communicatively coupled to the power converter. The controller may be configured to determine a low battery condition of the first battery such that the first battery has insufficient power to start the engine, and when the low battery condition occurs, to direct the power converter to supply power from the second battery to the first battery to thereby allow the engine to be started.

20 Claims, 3 Drawing Sheets

US 8,319,472 B2

METHOD AND SYSTEM FOR INTERNALLY JUMP-STARTING AN ENGINE

TECHNICAL FIELD

The present disclosure generally relates to vehicles with dual electrical systems such as hybrid-electric vehicles, and more particularly relates to methods and systems for starting vehicles with dual electrical systems.

BACKGROUND

Conventional jump-starting of a vehicle generally includes connecting a vehicle battery used to start the engine to an external power source, such as another vehicle or a battery pack designed for jump-starting. Electrical energy from the external power source is transferred to the vehicle battery. The battery and/or the external power source is then used to start the engine. Traditional jump-starting generally requires additional equipment such as jumper cables or a specifically designed battery pack to be available at the right time and place. If such equipment is not available when needed, traditional jump-starting may be impossible.

Accordingly, it is desirable to provide a vehicle that is configured to perform a jump-start without the need for external equipment. Furthermore, other desirable features and characteristics of will become apparent from the subsequent detailed description and the appended claims, taken in conjunction with the accompanying drawings and the foregoing technical field and background.

SUMMARY

An apparatus is provided for performing a jump-start without the use of external equipment. The apparatus comprises a first battery electrically coupled to a starter motor for an engine, the first battery providing power to start the engine; a second battery; a power converter electrically coupled to the first battery and electrically coupled to the second battery; and a controller communicatively coupled to the power converter. The controller may be configured to determine a low battery condition of the first battery such that the first battery has insufficient power to start the engine, and when the low battery condition occurs, to direct the power converter to supply power from the second battery to the first battery to thereby allow the engine to be started.

A method is provided for starting a vehicle, wherein the vehicle comprises a first battery coupled to an engine, a second battery, a power converter coupled between the first battery and the second battery, and a vehicle user display. The method comprises determining a low battery condition of the first battery. If the low battery condition is determined, activating the power converter with the engine off to charge the first battery from the second battery, and directing starting of the engine.

DESCRIPTION OF THE DRAWINGS

A more complete understanding of the subject matter may be derived by referring to the detailed description and claims when considered in conjunction with the following figures, wherein like numerals denote like elements.

DESCRIPTION OF AN EXEMPLARY EMBODIMENT

Figure 1:
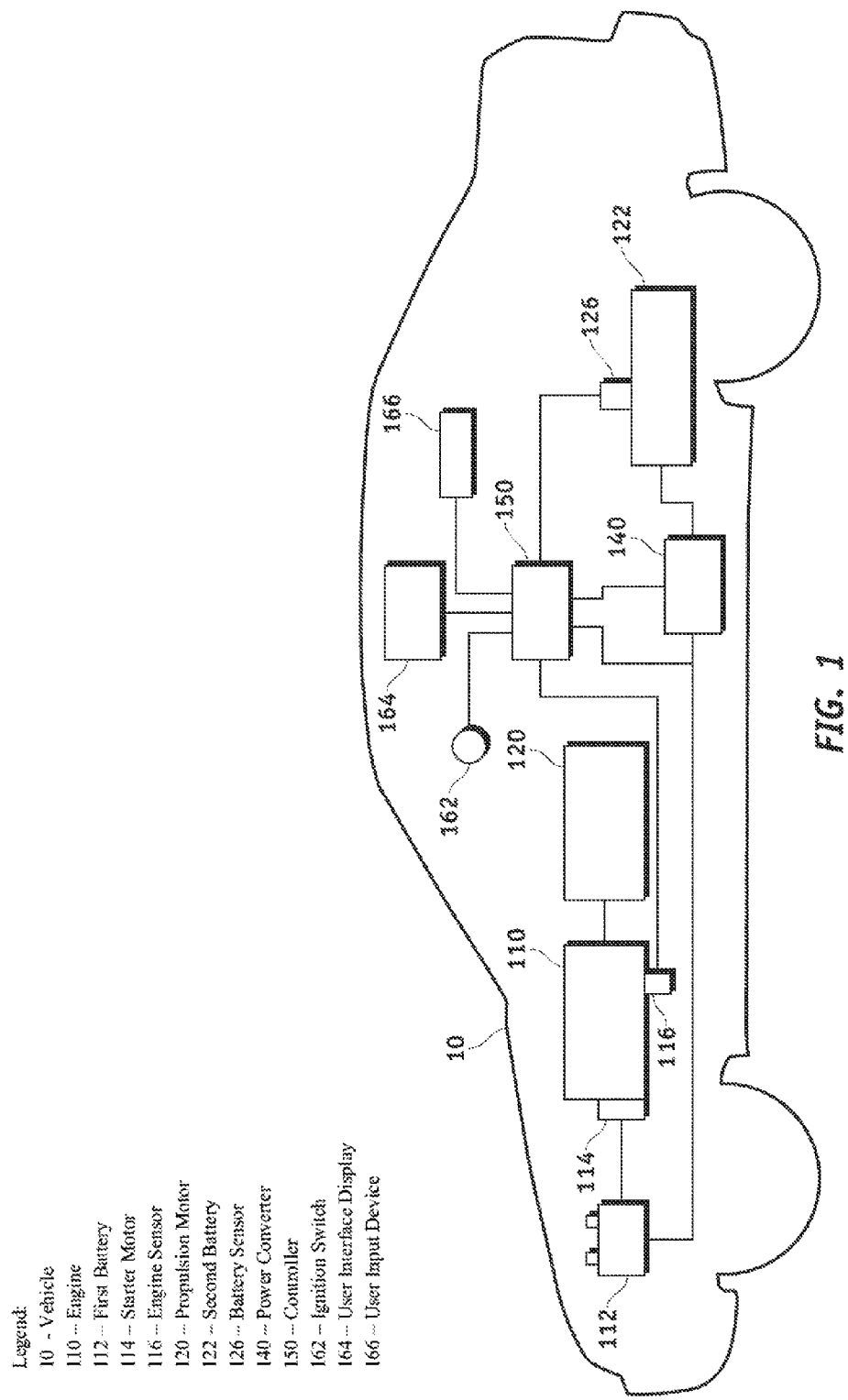
FIG. 1 is a diagram of an exemplary vehicle.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In an exemplary hybrid-electric vehicle a first electrical system with a first battery is used to start the engine of the vehicle. A second electrical system with a second battery is included as part of the vehicle for driving an electric motor as part of the propulsion system. In the exemplary hybrid-electric vehicle, the second battery is a high voltage battery and is not generally directly compatible for starting the engine. A power converter, however, can be used to convert power from the second battery and the second electrical system to the first battery and the first electrical system. In an exemplary embodiment, a controller in a hybrid electric vehicle determines when the first battery is in need of assistance to start engine 110, and uses the second battery and the power converter to perform an internal jump-start. Details of several exemplary embodiments will now be presented with particular reference to the drawing figures.

FIG. 1 shows an exemplary embodiment of a vehicle 10 with an engine 110 and a first battery 112. The exemplary vehicle also includes a starter motor 114, an engine sensor 116, a propulsion motor 120, a second battery 122, a battery sensor 126, a power converter 140, a controller 150, an ignition switch 162, a user interface display 164, and a user input device 166. The exemplary embodiment may include additional elements, devices and structures as are commonly found in hybrid-electric and other vehicles.

First battery 112 is any battery in vehicle 10 used for starting engine 110. First battery 112, in the exemplary embodiment, is a twelve volt battery connected to a first electrical system which is a corresponding twelve volt electrical system. In other embodiments, first battery 112 is designed to operate at other voltage levels, and in systems that operate at any other voltage levels.

In the exemplary embodiment, starter motor 114 is electrically coupled to first battery 112 and is configured to start engine 110. Starter motor 114, for example, may be a motor connected in a conventional manner to start engine 110. In other embodiments, starter motor 114 may be connected and configured in other ways for starting engine 110.

Engine 110 is any engine, such as an internal combustion engine, that is used in the operation of vehicle 10, to provide power to the vehicle's wheels. Engine 110 in the exemplary embodiment is designed to turn a propulsion motor 120, as well as a drive shaft. In other embodiments, engine 110 is designed and configured to drive a motor as an electric generator, which may not be connected to a drive shaft. Other configurations may employ other types of engines connected and configured in other ways.

Engine sensor 116 is a sensor configured to detect a state of engine 110. In the exemplary embodiment, engine sensor 116 is configured to detect whether engine 110 is running. Engine sensor 116 may be communicatively connected to controller 150. Engine sensor 116 may be any type of suitable sensor such as a vibration sensor, an engine rpm sensor, an electrical sensor detecting an electrical output, a magnetic sensor such as a Hall effect sensor detecting the position of an engine component, or other types of sensors. In one embodiment engine sensor 116 is not used, and controller 150 receives input from a user to initiate an internal jump start. In other embodiments controller 150 may receive input from a sensor and a user to initiate an internal jump-start.

Propulsion motor 120 is any motor designed to propel vehicle 10. In the exemplary embodiment, propulsion motor 120 is connected to engine 110 and to the drive shaft. In this embodiment, propulsion motor 120 is used as a generator to produce electricity at some times, and as a motor to propel vehicle 10 at other times. In one embodiment, both propulsion motor 120 and engine 110 provide power to a drive shaft as in a parallel hybrid-electric vehicle. In other embodiments, propulsion motor 120 propels vehicle 10, with engine 110 generating electricity supplied to motor 120 as in a series hybrid-electric vehicle. Other configurations of propulsion motor 120 and engine 110 may be used in other embodiments, such as mild-hybrid or full-hybrid electric vehicle configurations, as well as other configurations.

Second battery 122 is any battery designed to supply power to propulsion motor 120. Second battery 122 in the exemplary embodiment is a group of battery cells connected together to form a high voltage battery. In one embodiment second battery 122 is a battery pack with a nominal voltage between about one-hundred volts and ten-thousand volts, although other voltages and other ranges of voltages may be used in other embodiments. In one embodiment, for example, second battery 122 is a battery with cells connected in parallel to form a relatively low voltage and high output current battery.

Battery sensor 126 is any sensor designed to detect characteristics of second battery 122. In the exemplary embodiment, output from battery sensor 126 is used to determine the state of charge of second battery 122. If the state of charge of second battery is too low, then performing an internal jump-start using second battery 122 may not start engine 110, and/or may damage second battery 122. In one embodiment, the state of charge of second battery is therefore determined prior to performing an internal jump-start. In an exemplary embodiment battery sensor 126 measures the level of discharge of second battery 122 from a full charge state by measuring current flowing to the battery and current flowing from the battery. In another embodiment battery sensor 126 measures the voltage present across terminals of second battery 122. Battery sensor may also measure the output current of second battery 122 with a known load. The state of the charge of second battery 122 may be measured in other ways and with other sensors to measure electrical, thermal, and/or other characteristics of second battery 122.

Power converter 140 is any electrical device designed to convert electrical power from one voltage level to another voltage level. In the exemplary embodiment, power converter 140 is configured to convert power from the high voltage of the second electrical system with second battery 122 to the voltage of the first electrical system with first battery 112. Power converter 140 may be used to control the flow of electrical current to and from second battery 122. Power converter 140 may be communicatively coupled to controller 150 and activated by controller 150. In the exemplary embodiment power converter 140 is activated by controller 150 when first battery is low, to perform an internal jump-start from second battery 122 to first battery 112.

Controller 150 is any processor capable of directing an internal jump-start from second battery 122. In the exemplary embodiment, controller 150 is discussed as a single module. Controller 150 may alternatively be implemented with multiple processors in multiple modules that are communicatively coupled together. Controller 150 in an exemplary embodiment is a processor coupled to memory that contains suitable software and/or firmware logic for determining when an internal jump-start is appropriate, and for directing the internal jump start. Various types of memory may be used such as random access memory, flash memory, read-only memory, drum memory, magnetic core memory, bubble memory, twistor memory, and/or other types of magnetic or non-magnetic storage.

Ignition switch 162 is any switch used to indicate a start command for starting an engine. In the exemplary embodiment ignition switch 162 is a keyed switch with multiple key states including off, run, and crank, and is communicatively coupled to controller 150. Ignition switch 162 may also have an accessory state. In other embodiments an ignition switch is a push button that is separate from a lock and cylinder or other authentication device. Commands for providing key states, or the equivalent of key states, may be provided with multiple buttons and/or through another user interface including a vehicle display. In the exemplary embodiment, when controller 150 detects a run state from the ignition switch 162, controller 150 enables systems, including systems for starting the vehicle. When controller 150 detects ignition switch in the crank state, controller 150, in the exemplary embodiment, directs starter motor 114 to turn engine 115 with power from the first electrical system and first battery 112. When controller 150 receives a signal from ignition switch 162 indicating an off key state, controller 150 may direct engine 110 and power converter 140, as well as other components to shut down or turn off. In the exemplary embodiment, when ignition switch 162 is turned to crank and engine 110 fails to start, controller 150 directs power converter 140 to deliver power from second battery 122 to first battery 112 for starting engine 110. Controller 150, in the exemplary embodiment, determines that a jump-start is desired in two steps: first determining that the engine failed to start; and second receiving a command from a user to initiate an internal jump start. In an alternative embodiment, controller determines that an internal jump-start is appropriate using a signal from a sensor that measures the state of first battery 112.

User interface display 164 is any display device and/or group of devices that provides information to a user. In the exemplary embodiment, user interface display is a monitor that receives information from controller 150. In other embodiments, display 164 may be implemented with one or more gauges, indicators lights, audible features, and/or the like. Controller 150, after detecting that a failed attempt to start the engine has occurred, may display messages on user interface display 164 prompting a user to initiate an internal-jump start from second battery 122 to first battery 112. Controller 150 may also display messages related to the status of the internal jump-start.

User input device 166 is any component or device that is configured to accept user input and transmit the user input to controller 150. User input device, in an exemplary embodiment, allows a user to initiate actions such as an internal jump-start. In one embodiment, user input device 166 is combined with user interface display 164 with a touch screen interface. In another embodiment user input device 166 includes dials and/or buttons accessible to a vehicle operator under normal conditions. In the exemplary embodiment, controller 150 determines that a low battery condition exist for first battery 112 and prompts a vehicle operator through user interface display to initiate an internal jump-start. A start command may be received through user input device 166 when the vehicle operator indicates that the internal jump-start is desired.

Figure 2:
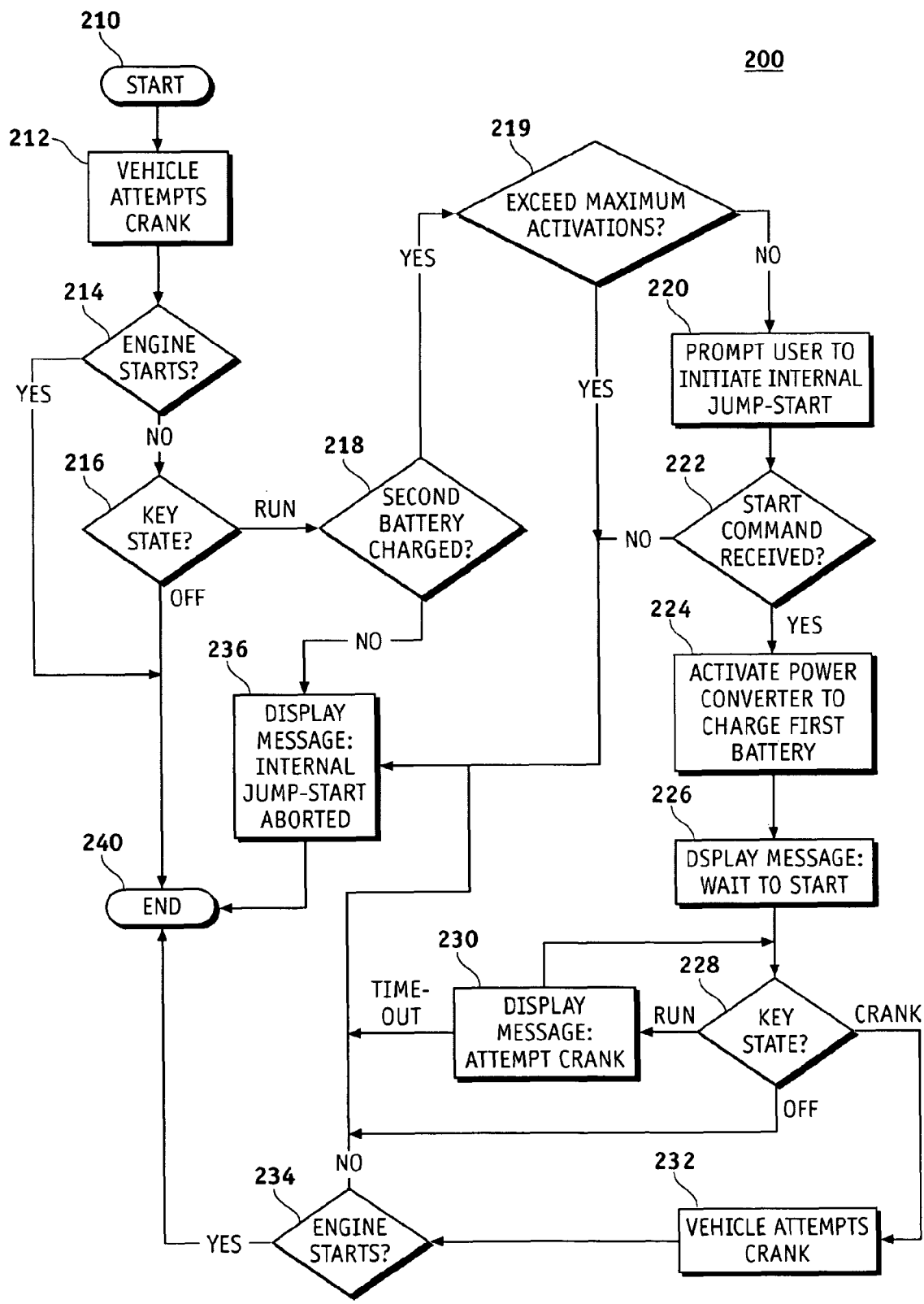
FIG. 2 is a flow chart of an exemplary method of starting a vehicle.

FIG. 2 shows a flow chart of an exemplary method 200 of starting a vehicle. Exemplary method 200 starts at step 210 with ignition switch 162 (FIG. 1) at the crank position. Vehicle 10 then attempts to crank engine 110 (step 212) using first battery 112 and starter motor 114. In one embodiment, controller 150 receives a signal from engine sensor 116 to determine if engine 110 starts successfully (step 214). In other embodiments other methods are used to determine if engine 110 starts successfully (step 214). If engine 110 does start successfully, the method ends (step 240), as an internal jump-start is not needed. If engine 110 does not start successfully then controller 150 determines, based on the failure of engine 110 to start, that a low battery condition exists for first battery 112. Controller 150 (FIG. 1) may monitor the state of ignition switch 162 on a continual, periodic or other basis (step 216) and if ignition switch 162 is in an off state, controller may end the internal jump-start process (step 240).

In exemplary method 200, if the ignition switch 162 remains in the run state (step 216), then the internal jump-start process continues. In one embodiment controller 150 determines if second battery 122 is in a state to supply power to charge first battery 112, and/or start engine 110 (step 218). Controller 150 may determine the state of charge for second battery 122 by receiving a signal from battery sensor 126 that senses an electrical characteristic of second battery 122. In other embodiments controller 150 uses other methods known in the art to determine the state of charge of second battery 122. In exemplary method 200, if controller 150 determines that second battery 122 is not in a state to perform an internal jump-start, then controller 150 directs user interface display 164 to display a message that internal jump-start was aborted (step 236), and ends the process of performing an internal jump-start (step 240).

In the exemplary method 200 of FIG. 2, after controller 150 (FIG. 1) determines that second battery 122 has an adequate charge for starting engine 110 and/or charging first battery 112, controller 150 determines if a predetermined maximum number of internal jump-starts would be exceeded by performing an internal jump-start (step 219). If the maximum would be exceeded, then controller 150 may display a message that the internal jump start is aborted (step 236). Controller 150 may display a message that the maximum number of internal jump starts has been reached, or may exit without displaying a message. In the exemplary method 200, if the maximum number of internal jump-starts has not been reached, then controller 150 prompts the user to initiate an internal jump start (step 220). Controller 150, for example, may display a message on user interface display 164 asking for a start command from the user through user input device 166 (step 220). Controller 150 may have an established time period for the start command to be received (step 222) from user input device 166. In exemplary method 200, if a start command is not received in the time period, or if the user indicates that the internal jump-start is not desired, controller 150 directs user interface display 164 to display the message that the internal jump-start is aborted (step 236), and ends the process of performing an internal jump-start (step 240). In exemplary method 200 if the start command is received (step 222) from user input device 166 (FIG. 1), then controller 150 activates power converter 140 to charge first battery 224 and/ or to provide power for starting engine 110. In the exemplary embodiment, controller 150 directs user interface display 164 to display a message for the user to wait before attempting to start engine 110 (step 226).

In one embodiment the message prompting the user to wait (step 226) is displayed for a first time period, such as between about ten seconds and about three-hundred seconds, although other time periods may be used for the first time period. During the first time period in the exemplary embodiment, controller 150 directs the charging of first battery 112 from second battery 122 through power converter 140. In exemplary method 200, controller 150 (FIG. 1) monitors the state of ignition switch 162 (step 228) during the first time period so that if ignition switch 162 is moved to the crank position, controller 150 allows an attempt to start engine 110 (step 232), after which the first time period ends. If the first time periods ends without an attempt to start engine 110 and ignition switch 162 is in the run position, controller 150 displays a message on the user interface display 164 prompting the user to attempt to start engine 110 (step 230). In an alternative embodiment, controller 150 monitors a state of charge of first battery 112, and ends the first time period if controller 150 determines that first battery 112 has sufficient charge to start engine 110.

In the exemplary embodiment the message directing the user to start engine 110 (step 230) is displayed during a second time period, such as between about ten second and about three-hundred seconds, although other time periods may be used for second time period. In exemplary method 200, controller 150 (FIG. 1) monitors the key state of ignition switch (step 228) while displaying the message during the second time period. In the exemplary embodiment, if controller 150 determines that the key state has been changed to crank, an attempt is made to crank engine 110, and the second time period ends after the attempt to start engine 110 (step 232). If, however, the second time period ends without an attempt to start engine 110, controller 150 may display a message that the internal jump-start has been aborted (step 236) and end the process (step 240). In one embodiment, controller 150 directs power converter 140 to supply power for charging first battery 112 and/or starting engine 110 during the second time period.

In exemplary method 200, the first time period may be used primarily to charge first battery 112 (FIG. 1) from second battery 122, and the second time period may be used primarily to supply power from second battery 122 for starting engine 110. In an alternative method, a user is prompted to start engine 110 without being prompted to wait, and the first time period and second time period are combined into one time period.

In exemplary method 200 shown in FIG. 2, after the vehicle attempts to crank or turn the engine for starting (step 232), if the engine does not start (step 234), then controller 150 directs user interface display to display a message that the internal jump-start process is aborted (step 236), and the process ends (step 240). If, however, controller 150 determines that engine 110 starts, then the internal jump-start process was successful and the process ends (step 240).

Figure 3:
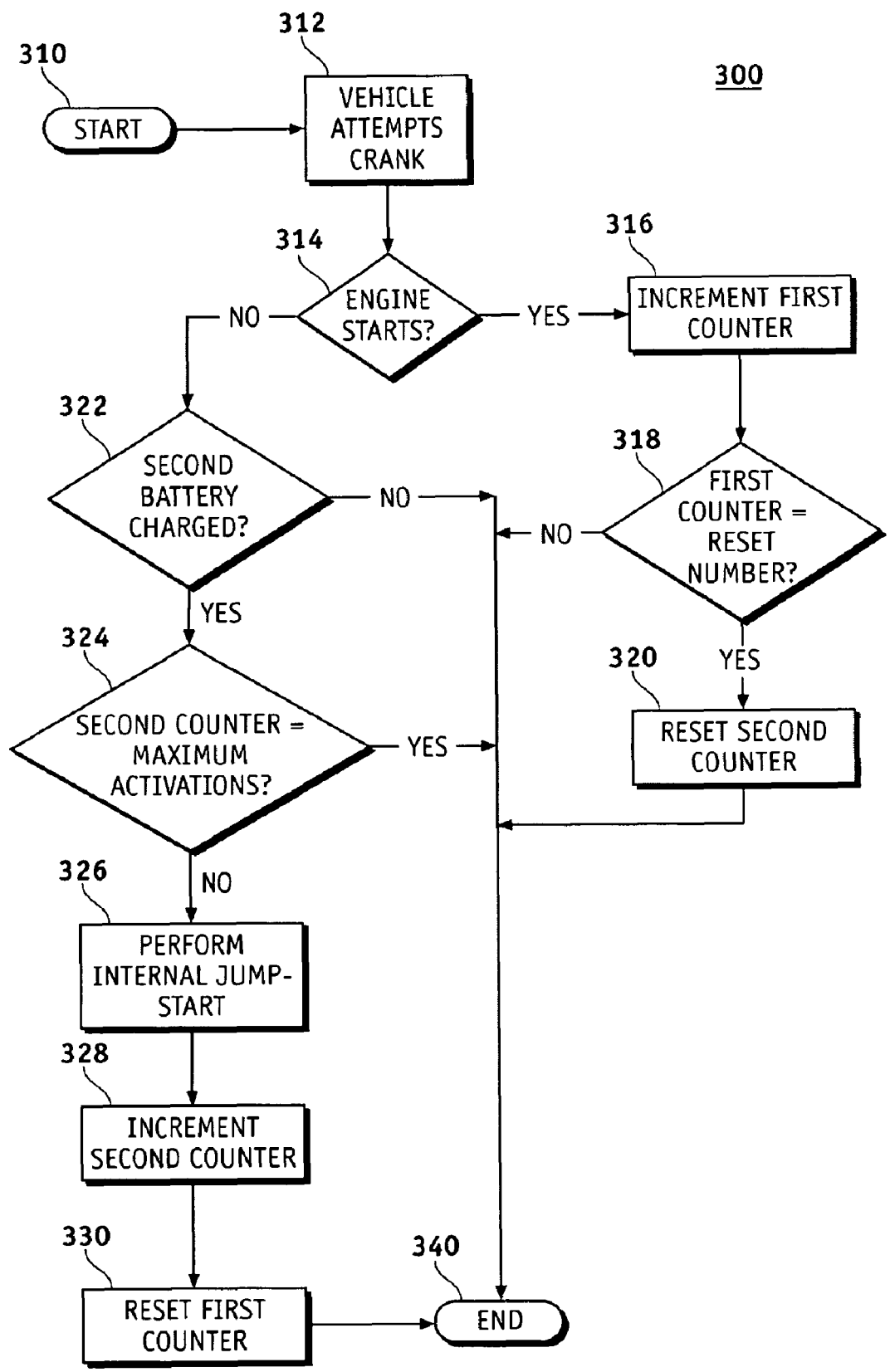
FIG. 3 is a flow chart of another exemplary method of starting a vehicle.

The exemplary method 200 shown in FIG. 2 is one embodiment of a method of starting a vehicle. Other methods, however, may include additional steps, or fewer steps, and the order and implementation of method steps may also be modified. FIG. 3, for example, shows a second method 300 of starting a vehicle, and includes steps related to limiting the activation of power converter 140 (FIG. 1) to a predetermined number of activations. Exemplary second method 300 begins at step 310. In an exemplary embodiment, controller 150 (FIG. 1) receives a signal indicating an attempt to start or crank engine 110 (step 312), for example from ignition switch 162. Controller 150 may determine if engine 110 starts successfully (step 314). In an exemplary embodiment, controller 150 includes memory with a first counter for tracking a number of times that engine 110 is started successfully, and a second counter for tracking a number of internal jump-start attempts, or activations of power converter 140 with engine 110 off.

The exemplary embodiment and method allows a jump-start without the use of additional equipment or an external power source. When first battery 112 is in need of assistance to start engine 110, typically a condition of first battery 112 or vehicle 10 needs to be addressed, such as a battery that has failed and needs to be replaced. To encourage a user to address the condition causing the need for a jump-start rather than relying on the internal jump-start, one embodiment limits the number of internal jump-starts. Exemplary second method 300 shown in FIG. 3, for example, limits the number of times a user may perform an internal jump-start.

In exemplary second method 300, controller 150 (FIG. 1) may determine when engine 110 fails to start (step 314), and then determine if second battery 122 is charged sufficiently for performing an internal jump-start (step 322). If second battery 122 is not sufficiently charged, then the process ends (step 340), and if second battery is sufficiently charged then controller may determine if the number of activations stored in the second counter equals a predetermined maximum number of activations (step 324). The maximum number of activations, for example, may be set at four activations, so that if four activations have occurred previously (and recently, as will be discussed below), the internal jump-start is not performed, and the process ends (step 340). In this example, if less than four activations have occurred previously, then controller 150 performs an internal jump-start (step 326), and controller 150 increments the second counter (step 328). In other exemplary embodiments of second method 300 the maximum activations may be set at other numbers, for example in a range between two and ten activations, or another suitable number.

In one embodiment, the second counter tracking the number of internal jump-starts is reset to zero when conditions indicate that the problem requiring the internal jump-start has been successfully addressed. If the problem is a failed battery, for example, the first counter may be reset by a service technician when a battery is replaced. If the problem is an accessory that was accidently left on, or another drain on first battery 112 that has been addressed, then second counter may be reset. In one embodiment, controller 150 uses the number of successful starts of engine 110 stored in the first counter as an indication that the problem requiring an internal jump-start has been solved if the internal jump-start has not been performed recently. The first counter, for example, may be compared against a predetermined reset number, and the second counter that tracks the number of internal jump starts may be reset when the first counter equals the predetermined reset number. The reset number, for example, may be set at one-hundred so that when engine 110 starts successfully one-hundred times without an internal jump-start, the second counter will be reset to zero.

In an illustrative example for the purpose of discussion, the second counter is reset to zero when the first counter reaches sixty. In the illustrative example the first counter has a value of thirty-five (representing thirty-five previous engine starts since the last internal jump start), the second counter has a value of two (representing two previous internal jump-starts), and an associated maximum activation number of six. In this example a third internal jump start is performed (step 326), and the second counter is incremented to a value of three (step 328), then first counter is reset from thirty-five to zero (step 330). The user, in this example, continues to successfully start the vehicle, and each time the engine starts the first counter is incremented by one (step 316), and the value of the first counter is compared to the exemplary reset number of sixty (step 318). When the first counter is incremented to sixty after a successful start, controller 150 (FIG. 1) resets the second counter that tracks the number of internal jump-starts from three to zero (step 320). In other embodiments other numbers may be used for the reset number, and the maximum activations. The reset number, for example may be selected from within a range of about 20 to about 200 or any other value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of starting a vehicle, wherein the vehicle comprises a first battery coupled to an engine, a second battery, a power converter coupled between the first battery and the second battery, and a vehicle user display, the method comprising:
    determining a low battery condition of the first battery;
    if the low battery condition is determined,
    activating the power converter with the engine off to charge the first battery from the second battery, subject to a limiting of the activating based at least in part on a number of times that the engine is started successfully and a number of times that the first battery is charged using the second battery; and
    directing starting of the engine.

2. The method of starting the vehicle according to claim 1 further comprising:
    displaying a message on the vehicle user display prompting the operator to activate the power converter; and
    receiving a start command from the operator prior to the activating the power converter.

3. The method of starting the vehicle according to claim 1 wherein the determining the low battery condition comprises detecting a failed attempt to start the engine.

4. The method of starting the vehicle according to claim 1 wherein the determining the low battery condition comprises sensing an electrical characteristic of the first battery.

5. The method of starting the vehicle according to claim 1 wherein the method further comprises determining if the second battery is in a state to supply power for starting the engine.

6. The method of starting the vehicle according to claim 1 wherein the activating is performed for a first time period to charge the first battery from the second battery during the first time period.

7. The method of starting the vehicle according to claim 6 further comprising displaying a message on the vehicle user display during the first time period directing the operator to wait before attempting to start the engine.

8. The method of starting the vehicle according to claim 7 further comprising displaying a message on the vehicle user display directing the operator to attempt to start the engine during a second time period after the first time period.

9. The method of starting the vehicle according to claim 8 wherein the activating is performed during the second time period to supply power for starting the engine during the second time period.

10. The method of starting the vehicle according to claim 1 further comprising limiting the activating of the power converter with the engine off to a predetermined number of activations.

11. The method of starting the vehicle according to claim 10 wherein the vehicle further comprises a controller comprising a first counter and a second counter, and wherein the limiting of the activating of the power converter with the engine off comprises:

incrementing the first counter each time the engine is successfully started using the first battery to thereby store a first value in the first counter equal to the number of times the engine is successfully started using the first battery;

incrementing the second counter each time the activating of the power converter with the engine off is performed to thereby store a second value in the second counter equal to the number of times the first battery is charged using the second battery;

resetting the first counter to zero each time the activating of the first battery is charged using the second battery;

resetting the second counter to zero when the first value in the first counter is equal to a predetermined reset number; and comparing the second value in the second counter to the predetermined number of activations.

12. A vehicle comprising:

a first battery electrically coupled to a starter motor for an engine, the first battery providing power to start the engine;

a second battery;

a power converter electrically coupled to the first battery and electrically coupled to the second battery; and a controller communicatively coupled to the power converter, the controller configured to determine a low battery condition of the first battery such that the first battery has insufficient power to start the engine, and when the low battery condition occurs, to direct the power converter to supply power from the second battery to the first battery to thereby allow the engine to be started, subject to a limiting of the directing of the power converter to supply power from the second battery to the first battery, the limiting based at least in part on a number of times that the engine is started successfully and a number of times that the first battery is charged using the second battery.

13. The vehicle according to claim 12 further comprising a user interface display communicatively coupled to the controller, wherein the controller is configured to display a message on the user interface display regarding an option to start the engine using power from the second electrical system.

14. The vehicle according to claim 12 further comprising:

an engine sensor communicatively coupled to the controller, the engine sensor configured to detect an engine state; and an ignition switch communicatively coupled to the controller, the ignition switch having an ignition switch state;

wherein the controller receives an engine state signal from the engine sensor and an ignition state signal from the ignition switch, and determines the low battery condition of the first battery based on the engine state signal and the ignition state signal.

15. The vehicle according to claim 12 further comprising:

a propulsion motor configured to propel the vehicle, the second battery configured to supply power to the propulsion motor, a battery sensor communicatively coupled to the controller, the battery sensor configured to measure an electrical characteristic of the second battery, wherein the controller receives a battery state signal from the battery sensor related to the electrical characteristic of the second battery, and wherein the controller includes a stored reference value, and compares the stored reference value to the battery state signal to determine if the second battery is in a state to supply power for starting the engine.

16. The vehicle of claim 12, wherein the controller is further configured to:

increment a first counter each time the engine is successfully started using the first battery to thereby store a first value in the first counter equal to a number of times the engine is successfully started using the first battery;

increment a second counter each time the activating of the power converter with the engine off is performed to thereby store a second value in the second counter equal to a number of times the first battery is charged using the second battery;

reset the first counter to zero each time the activating of the first battery is charged using the second battery;

reset the second counter to zero when the first value in the first counter is equal to a predetermined reset number; and compare the second value in the second counter to the predetermined number of activations.

17. A control system for a vehicle, wherein the vehicle comprises an engine electrically coupled to a first electrical system with a first battery, a second electrical system with a second battery, and a power converter coupled between the first electrical system and the second electrical system, the control system communicatively coupled to the power converter, the control system comprising:

an engine sensor configured to detect a state of the engine and to transmit an engine state signal related to the state of the engine;

a battery sensor configured to measure electrical characteristics related to the second battery and to transmit a battery state signal related to a state of the second battery;

a control module communicatively coupled to the engine sensor, the battery sensor, and to the power converter, the control module configured to receive the engine state signal and the battery state signal, wherein the control module is configured to use the engine state signal to determine when an attempt to start the engine using the first battery is likely to fail and to use the battery state signal to determine when the second battery is in a state to supply power for starting the engine, and wherein the control module is further configured to direct the power converter to supply power from the second battery to the first battery when the attempt to start the engine using the first battery is likely to fail and when the second battery is in the state to supply power for starting the engine, subject to a limiting of the directing of the power converter to supply power from the second battery to the first battery, the limiting based at least in part on a number of times that the engine is started successfully and a number of times that the first battery is charged using the second battery.

18. The control system according to claim 17, wherein the control module is configured to limit the activating of the power converter to a predetermined number of activations.

19. The control system according to claim 17 wherein the control system further comprises:
a user display communicatively coupled to the control module; and
a user input device communicatively coupled to the control module;
wherein the control module directs a user to initiate the supplying of power from the second electrical system to the first electrical system after determining that the attempt to start the engine using the first battery is likely to fail, and wherein the control module is configured to receive a user input from the user input device prior to the supplying of power from the second electrical system to the first electrical system for starting the engine.

20. The control system of claim 17, wherein the control module is further configured to:
increment a first counter each time the engine is successfully started using the first battery to thereby store a first value in the first counter equal to a number of times the engine is successfully started using the first battery;
increment a second counter each time the activating of the power converter with the engine off is performed to thereby store a second value in the second counter equal to a number of times the first battery is charged using the second battery;
reset the first counter to zero each time the activating of the first battery is charged using the second battery;
reset the second counter to zero when the first value in the first counter is equal to a predetermined reset number; and
compare the second value in the second counter to the predetermined number of activations.

* * * * *